United States Patent [19]

Hasegawa et al.

[11] 4,085,343
[45] Apr. 18, 1978

[54] ROTOR FOR A ROTARY ELECTRICAL MACHINE HAVING A SUPERCONDUCTIVE FIELD WINDING

[75] Inventors: Kunio Hasegawa; Hidetomo Nishimura; Kiyoshi Yamaguchi, all of Hitachi, Japan

[73] Assignee: Hitachi, Ltd., Japan

[21] Appl. No.: 692,197

[22] Filed: Jun. 2, 1976

[30] Foreign Application Priority Data

Jun. 13, 1975 Japan .................................. 50-70863
Jul. 9, 1975 Japan .................................. 50-83424

[51] Int. Cl.² .............................................. H02K 9/00
[52] U.S. Cl. ......................................... 310/52; 310/261
[58] Field of Search ................... 310/64, 54, 165, 10, 310/40, 52, 261, 264, 265

[56] References Cited

U.S. PATENT DOCUMENTS

| 3,644,766 | 2/1972 | Hughes | 310/40 |
| 3,648,082 | 3/1972 | MacNab | 310/10 |
| 3,679,920 | 7/1972 | MacNab | 310/10 |
| 3,742,265 | 6/1973 | Smith | 310/52 |
| 3,781,578 | 12/1973 | Smith | 310/52 |
| 3,816,780 | 6/1974 | Smith | 310/52 |
| 3,934,163 | 1/1976 | Mailfert | 310/10 |
| 3,942,053 | 3/1976 | Abolins | 310/10 |
| 3,956,648 | 5/1976 | Kirtley | 310/10 |
| 3,999,091 | 11/1974 | Kirtley | 310/40 |

FOREIGN PATENT DOCUMENTS 2,418,260 10/1975 Germany .......................... 310/40

*Primary Examiner*—R. Skudy
*Attorney, Agent, or Firm*—Craig & Antonelli

[57] ABSTRACT

A rotor for a rotary electrical machine having a superconductive field winding, wherein thermal resistance means is arranged at contact parts between a damper, which is so disposed as to cover the superconductive field winding, and a damper support which supports the damper from the inner side thereof. A plurality of protuberances are formed on either said damper support or said damper for restricting heat flow between said damper and said damper support. It is possible to cause a cooling medium to flow through interstices which are defined at the contact parts between the damper and the damper support.

12 Claims, 9 Drawing Figures

ROTOR FOR A ROTARY ELECTRICAL MACHINE HAVING A SUPERCONDUCTIVE FIELD WINDING

BACKGROUND OF THE INVENTION

This invention relates in general to a rotor for a rotary electrical machine having a superconductive field winding. More particularly, it relates to a rotor for a rotary electrical machine having a superconductive field winding, wherein the transfer of heat from a damper disposed for preventing a varying magnetic field from being applied to the superconductive field winding to the superconductive field winding is reduced.

A superconductive rotary electrical machine generally employs a superconductive wire for the field winding of the rotor thereof. The superconductive wire is made of a metallic material whose electric resistance becomes zero when it is cooled to an extremely low temperature close to the absolute zero point. The magnetic field which is generated by a field winding of superconductive wire can be made more intense than that provided in a conventional rotary electrical machine, and hence, as a result of use of a superconductive field winding, the output of the rotary electrical machine can be intensified. However, when the superconductive wire is subjected to a varying magnetic field of significantly great magnitude, it becomes heated and therefore becomes incapable of maintaining the superconducting state with the result that it transfers to the normally conducting state. For this reason, it is conventional to provide a damper made of a good electrical conductor, such as copper and aluminum, to cover the superconductive field winding and thereby shield it from varying magnetic fields. This is disclosed in and is known from U.S. Pat. No. 3,679,920.

As stated previously, the superconductive wire produces its beneficial advantages only if it operates in the superconducting state when cooled to an extremely low temperature. It is, therefore, indispensable to maintain the superconductive wire at the extremely low temperature required for superconductivity. However, the damper functions as a shield so that, where a magnetic flux changes (as at the time when the rotary electrical machine becomes out of order) an eddy current is caused to flow in the damper thereby to prevent the magnetic flux change from being transmitted to the superconductive wire inside the damper. Joule loss is generated in the damper by the eddy current, and the damper is thereby heated. The Joule loss is very great, and a temperature rise to above 200° C., which can result in undesirable transfer of heat to the superconducting field winding, occurs locally.

In order to resist the electromagnetic force acting on the damper, a cylindrical damper support is disposed in contact with the inner surface of the damper. Due to the heating of the damper, the damper support is also heated, and radiant heat from the damper support is transferred to the superconductive field winding. When a large amount of radiant heat is transferred to the superconductive field winding, the temperature of the superconductive wire is raised, and the superconductive wire becomes incapable of maintaining the superconducting state.

In order to solve this problem, it has been proposed to cool the damper by providing cooling passage holes in the damper and causing a cooling medium to flow therethrough. However, the efficiency of cooling with a coolant is limited, and, therefore, it is impossible to fully remove the heat generated in the damper by the use of the coolant.

SUMMARY OF THE INVENTION

It is an object of this invention to provide a rotor for a rotary electrical machine having a superconductive field winding and means to eliminate or substantially reduce the transfer of heat to the superconductive field winding, the heat being generated in a damper which is disposed adjacent the field winding to prevent a varying magnetic field from acting on the superconductive field winding.

Another object of this invention is to provide a rotor for a rotary electrical machine having a superconductive field winding, which rotor is easily constructed in order to eliminate or substantially reduce heat which may be transferred from a damper to the superconductive field winding.

This invention is directed to a rotor body which has a shaft rotatably supported by bearing means, a superconductive field winding arranged in a hollow portion of the rotor body and formed by a winding of superconductive wire which is cooled to an extremely low temperature. A cylindrical damper is arranged in a manner to surround the field winding and is made of a good electrical conductor. A cylindrical damper support supports the damper in contact therewith from the field winding side and, in accordance with this invention, is so arranged as to define a vacuum space between it and the field winding. In addition, thermal resistance means is provided at contact parts between the damper and the damper support. The thermal resistance means is constructed by forming protuberant portions in at least one of the damper and the damper support or by arranging a spacer between the damper and the damper support. It is possible to cause a cooling medium to flow through interstices which are defined by the protuberant portions or by the spacer. It is also possible to separately cool the damper support.

Further objects of this invention will become more apparent from the following description of various exemplary embodiments illustrated in the accompanying drawings.

DETAILED DESCRIPTION OF THE PREFERRED EMBODIMENTS

Figure 1:
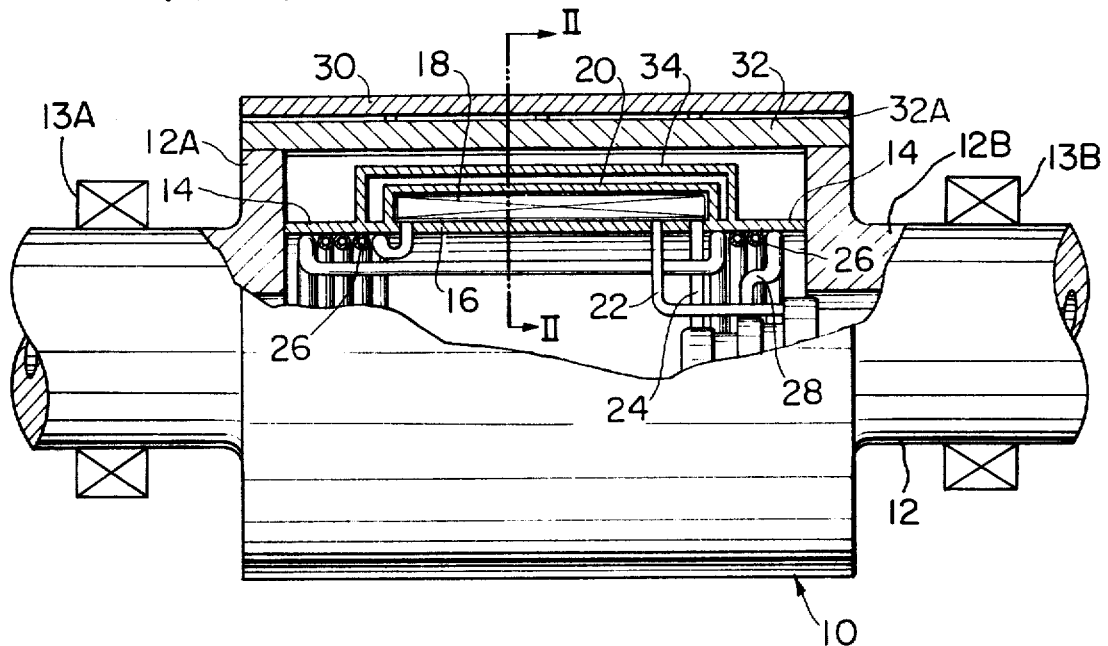
FIG. 1 is a side view, partly in section, which shows a rotary electrical machine having a superconductive field winding.

FIG. 1 shows an embodiment of this invention as applied to a rotor 10, which is provided with a rotary machine shaft 12. The rotary machine shaft 12 is constituted of a drive shaft 12A, which transmits a torque from a prime mover for driving the rotor, and a supply and discharge shaft 12B, which is used for supplying a cooling medium to the shaft and discharging it after it has circulated, the cooling medium being utilized for the cooling of the elements of the shaft, the thermal shield, etc., of a superconductive field winding, etc., inside the rotor. The shafts 12A and 12B are rotatably supported by bearings 13A and 13B.

A hollow and thin-walled torque tube 14 is disposed between the drive shaft 12A and the supply and discharge shaft 12B, that is, on the side of the axis of a barrel portion. In a winding space 16 outside the central part of the torque tube 14, the superconductive field winding 18 made of a superconductive wire is arranged. A cover 20 is disposed in a manner to conceal the superconductive field winding 18. The superconductive field winding 18 is energized by an excitation power source (not shown) outside the rotor 10 through power leads extending in a lead tube 22.

It is important to maintain the superconductive field winding 18 at an extremely low temperature or in the superconducting state, as already discussed. To this end, the superconductive wire must always be held at or below a critical temperature. A cooling medium, for example, liquid helium, is therefore fed from an introduction tube 24 into the winding space 16. The liquid helium fed into the winding space 16 cools the superconductive field winding 18 and advances towards a heat exchanger 26, which is laid over the entire area of the inner peripheral side of the torque tube 14. The heat exchanger 26 removes conduction heat which tends to enter into the winding space 16 through the torque tube 14 from the drive shaft 12A and the supply and discharge shaft 12B. The liquid helium having passed through the heat exchanger 26 is discharged out of the rotor 10 by way of an exhaust tube 28.

The drive shaft 12A and the supply and discharge shaft 12B are coupled by a damper 30 which electromagnetically protects the superconductive field winding 18 on the rotor side from an anti-phase withstand voltage component which may be received from a stator side armature coil (not shown), for example, during a sudden short-circuit, and from any high frequency components, and a damper support 32 which is contiguous to the inner side of the damper 30 and provides the mechanical strength needed by the damper 30. Disposed between the damper support 32 and the superconductive field winding 18 is a radiation shield 34 whose surface is provided with a mirror finish in order to isolate the damper support 32 and the superconductive field winding 18 so as to prevent radiant heat from being transferred from the former to the latter. A space in the rotor 10, as defined by the drive shaft 12A, the supply and discharge shaft 12B and the damper support 32, is held under vacuum in order to minimize heat transfer based on a convection from entering into the winding space 16.

In the rotor for the superconductive rotary machine of such construction, it is indispensable to maintain the superconductive field winding 18 under the superconducting state. Therefore, a variety of expedients for preventing heat from being applied to the superconductive field winding 18 are provided in accordance with this invention. As stated above, the conduction heat which arrives through the torque tube 14 from the drive shaft 12A and the supply and discharge shaft 12B is conducted away by the heat exchanger 26 to some extent. Nevertheless, there is heat which affects the superconductive field winding 18. Besides, there is heat entry from the side of the damper 30 to the superconductive field winding 18. Such heat entry to the superconductive field winding 18, especially the heat entry which occurs during sudden short-circuit conditions poses a problem.

In the superconductive rotary machine, an eddy current is generated in the damper 30 by a magnetic flux change based on the antiphase component which is exerted from the armature during sudden short-circuit operation. The damper 30 is deformed due to an electromagnetic force which acts between the eddy current and the armature current. In order to support the deformation of the damper 30, the damper support 32 made of a nonmagnetic material which is higher in mechanical strength than the damper 30 is disposed as a reinforcement element inside the damper. Due to the fact that the eddy current flows in the damper 30 during sudden short-circuit operation, heat based on Joule loss develops. That is, although the damper 30 dissipates the energy of the magnetic flux change exerted by the armature in the form of heat and achieves electromagnetic shielding of the winding 18 so as to prevent the antiphase component and the high frequency component, arising during the short-circuit operation, from getting to the superconductive field winding 18 in the winding space 16, the heat generated due to the function is a serious problem.

It is the object of this invention to prevent the heat, generated by the damper 30, from being transferred to the superconductive field winding 18. The construction of this invention will be explained with reference to FIGS. 2 and 3.

Figure 2:
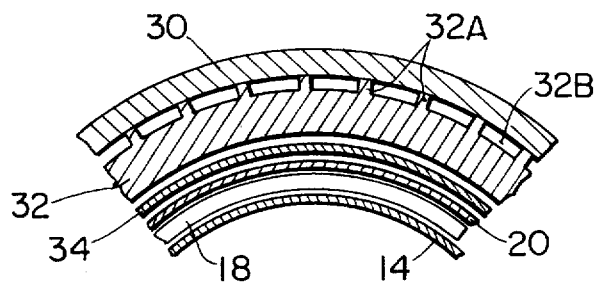
FIG. 2 is a partial sectional view which is taken along line II — II in FIG. 1.
Figure 3:
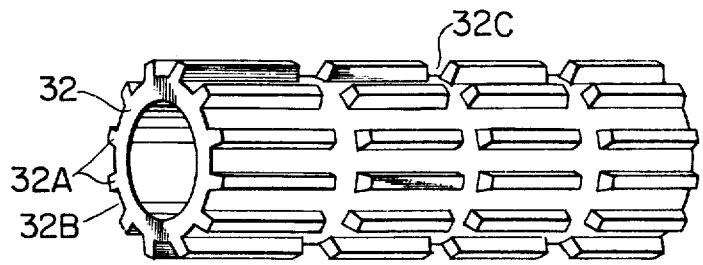
FIG. 3 is a perspective view of a damper support.

As shown in FIGS. 2 and 3, the damper support 32 is formed with a series of external convex or protuberant portions 32A as resistance means spaced circumferentially on its outer peripheral surface. The protuberant portions 32A are integral with the damper support 32, extend in the axial direction of the support, and are divided at several suitable positions. A plurality of such protuberant portions 32A are disposed in the circumferential direction, as seen in FIG. 3, and an interstice 32B is defined between the circumferentially adjacent protuberant portions 32A.

The damper support 32 is in close contact with the damper 30 via the protuberant portions 32A thereof. The interstice 32B defined by the adjacent protuberant portions 32A and the part of the damper 30 which covers the interstice constitute a cooling medium passage through which is passed a cooling medium for cooling the damper 30.

In such a construction, the heat developing in the damper 30 during a sudden short-circuit is removed by the coolant which flows through cooling passages or interstices 32B. However, as the temperature of the coolant rises, the cooling efficiency lowers gradually. Heat which cannot be removed will be conducted to the damper support 32 through the protuberant portions 32A or through the coolant. In this embodiment, however, the inner periphery of the damper 30 and the outer periphery of the damper support 32 are not held in close contact over the whole circumference of the respective elements, but only the protuberant portions 32A of the damper support 32 are in close contact with the damper 30. The close contact area between the damper 30 and the damper support 32 is therefore relatively small. In addition, the cooling medium circulated through the interstices 32B between the damper 30 and the damper support 32 serve to thermally insulate the exposed surfaces of the portions 32A and 32B from one another so that the quantity of heat conducted to the damper support 32 is very small. That is, the conduction area between the elements 30 and 32 is reduced owing to the provision of the channel portions 32B at the outer periphery of the damper support 32, which reduces the contact area between the elements. Thus, the damper 30 and the damper support 32 have relatively large areas in contact with the cooling medium, so that the temperature rise of the damper support 32 is delayed in time and is smaller than the case where the damper support 32 is held in close contact with the damper 30 over the whole circumference thereof, with the result that the influences exerted on the superconductive field winding by the radiant heat and the conduction heat are greatly reduced.

Since the protuberant portions 32A formed on the damper support 32 are split at suitable intervals in the axial direction, a recess portion 32C appears between the axially adjacent protuberant parts 32A. Such recess portions 32C lie in the circumferential direction substantially continuously and are used as cooling passages in the circumferential direction through which a cooling medium is passed. Thus, the close contact area between the damper 30 and the damper support 32 is diminished further by the recess portions 32C, and the cooling efficiency can be enhanced even more. Further, the protuberant portions 32A of the damper support 32 have a spring action and absorb vibrations or electromagnetic forces to which the damper 30 is subjected, so that the deformation of the damper 30 can also be prevented.

Other embodiments of this invention are shown in FIGS. 4 to 7, respectively.

Figure 4:
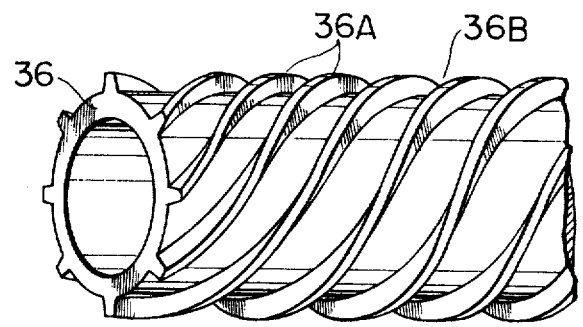
FIG. 4 is a perspective view of another embodiment of a damper support.

In the embodiment shown in FIG. 4, the thermal resistance means of the damper support 36 is formed as continuous helical protuberant portions 36A. Only the helical portions 36A are contiguous to the damper 30, and the channel portions 36B defined between the adjacent convex portions are used as the cooling passages through which the cooling medium flows.

Figure 5:
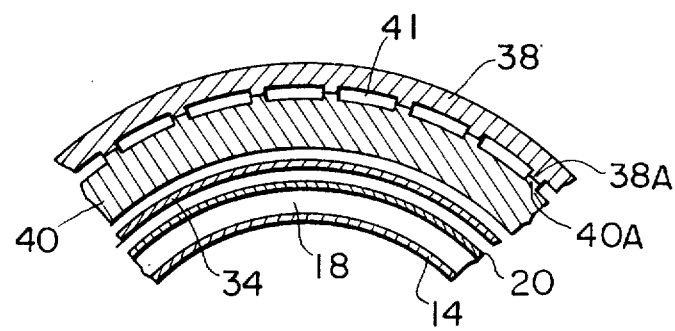
FIGS. 5 to 9 are partial sectional views corresponding to FIG. 2, each of which shows another embodiment of this invention.

In the embodiment illustrated in FIG. 5, the protuberant and intervening channel portions forming the thermal resistance means are provided on both the damper 38 and the damper support 40. The damper 38 and the damper support 40 are held in contact in such a manner that protuberant portions 38A of the damper 38 and protuberant portions 40A of the damper support 40 butt against each other. With such a positional arrangement of the damper 38 and the damper support 40, a channel portion 41 is defined between the adjacent pairs of the protuberant portions 38A and 40A. Such concave portions 41 are used as the cooling medium passages through which the cooling medium flows.

Figure 6:
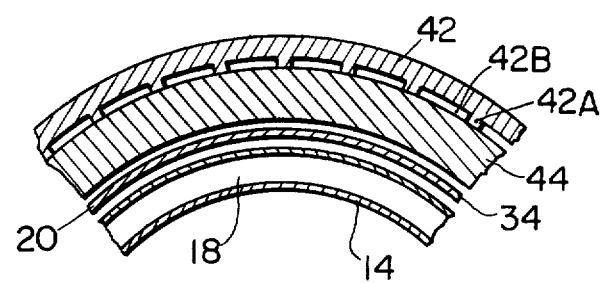

In the embodiment illustrated in FIG. 6, the thermal resistance means is provided only in the damper 42. A plurality of convex portions 42A are formed on the inner side of the damper 42. The protuberant portions 42A are held in contact with a damper support 44, and channel portions 42B are defined between the adjacent protuberant portions 42A. The channel portions 42B are used as the cooling medium passages through which the cooling medium flows. The damper 42 has the contact area with the coolant increased by an amount corresponding to the exposed surface area of channel portions 42A, which is particularly effective for the cooling of the damper 42 to prevent heating of the element.

Figure 7:
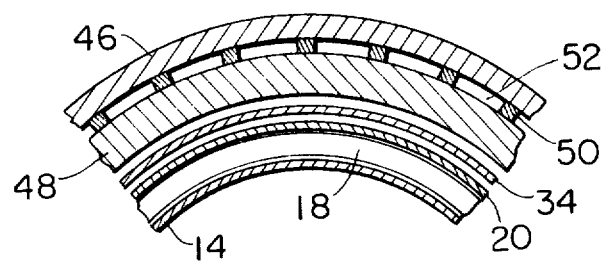

In the embodiment shown in FIG. 7, the thermal resistance means is provided in such a way that a spacer 50 made of a material of good heat insulation is radially interposed between a damper 46 and a damper support 48 and a cooling passage 52 for circulating the cooling medium therethrough is defined between the adjacent spacer parts.

The embodiments having been thus far explained can achieve the same effects as in the embodiment described in conjunction with FIGS. 1 to 3.

Figure 8:
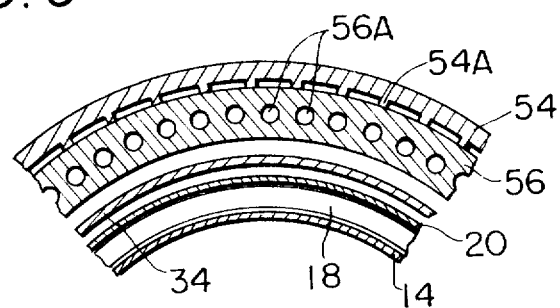

FIG. 8 shows a further embodiment. In this embodiment, the thermal resistance means is constructed by disposing protuberant portions 54A provided on a damper 54 in contact with damper support 56, and cooling holes 56A for circulating the cooling medium are provided in the damper support 56. Although the transfer path of heat generated in the damper 54 to the damper support 56 is reduced by the small size of the protuberant portions 54A provided on the damper 54, heat is still transferred to the damper support 56 through these contact areas, with the result that the temperature of the damper support 56 is thereby raised even though to a limited extent. In order to prevent such temperature rise in the support 56, cooling medium is circulated through the cooling holes 56A of the damper support 56 so as to cool the damper support 56. Cooling medium may also be circulated through the channels between protuberant portions 54A, as described in the embodiment of FIG. 1.

Figure 9:
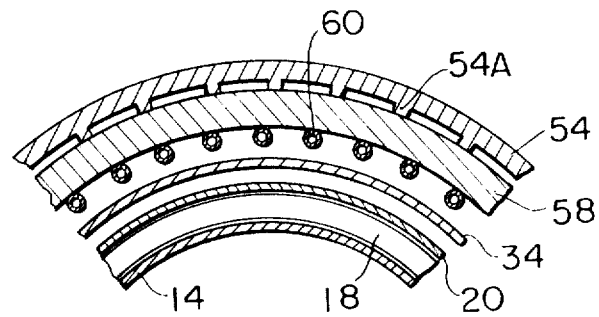

FIG. 9 shows a still further embodiment of the present invention in which the damper 54 is provided with protuberant portions 54A which contact the damper support 58. A plurality of cooling pipes 60 are mounted in a manner to be contiguous to the inner surface of the damper support 58. In order to hold the cooling pipes 60 and the damper support 58 in close contact for good heat conduction, it is favorable to join the cooling pipes 60 and the damper support 58 by welding.

Although heat generated by the damper 54 in FIG. 9 is for the most part prevented from transferring to the damper support 58 owing to the thermal resistance means formed by the protuberant portions 54A, a part of the generated heat is transmitted to the damper support 58 through the convex portions 54A of the damper with the result that the damper support 58 is heated by the transmitted heat. Herein, however, the inner surface of the damper support 58 is cooled by the cooling medium flowing through the cooling pipes 60. It is therefore possible to reduce the temperature of the inner surface of the damper support 58 to a value lower than that of the other parts and to reduce the radiant heat which transfers from the damper support 58 to the superconductive field winding side. Thus, it is possible to lessen the radiant heat transferring to the superconductive field winding 18 and to lessen the temperature rise in the superconductive field winding 18.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A rotor for a rotary electrical machine having a superconductive field winding, comprising a hollow rotor body including a shaft rotatably supported by bearing means, the superconductive field winding being arranged in the hollow portion of said rotor body and formed by a winding of superconductive wire, first means for cooling the field winding to an extremely low temperature, a hollow cylindrical damper disposed to surround the field winding and being made of a good electrical conductor, a cylindrical damper support disposed between said damper and the field winding for supporting said damper, a vacuum space being defined between said damper support and the field winding, said damper support having a plurality of protuberances projecting from the surface of said damper support to contact said damper for restricting heat flow between said damper and said damper support, said protuberances being elongated projections extending in the axial direction of said rotor body, and second means for circulating a cooling medium through interstices defined between said protuberances.

2. The rotor for a rotary electrical machine having a superconductive field winding as defined in claim 1, wherein said damper is also provided with a plurality of protuberances extending from the inner circumferential surface thereof in alignment with the protuberances on said damper support so that the protuberances on said damper and said damper support are held in contact with one another.

3. The rotor for a rotary electrical machine having a superconductive field winding as defined in claim 1, wherein said protuberances are arranged helically with respect to the axis of said rotor body.

4. A rotor for a rotary electrical machine having a superconductive field winding comprising a hollow rotor body including a shaft rotatably supported by bearing means, the superconductive field winding being arranged in the hollow portion of said rotor body and formed by a winding of superconductive wire, first means for cooling the field winding to an extremely low temperature, a hollow cylindrical damper disposed to surround the field winding and being made of a good electrical conductor, a cylindrical damper support disposed between said damper and the field winding for supporting said damper, a vacuum space being defined between said damper support and the field winding, said damper having a plurality of protuberances projecting from the inner cylindrical surface of said damper to contact said damper support for restricting heat flow between said damper and said damper support, said protuberances being elongated projections extending in the axial direction of said rotor body, and second means for circulating a cooling medium through interstices defined between said protuberances.

5. The rotor for a rotary electrical machine having a superconductive field winding as defined in claim 4, wherein said protuberances are arranged helically with respect to the axis of said rotor body.

6. A rotor for a rotary electrical machine having a superconductive field winding comprising a hollow rotor body including a shaft rotatably supported by bearing means, the superconductive field winding being arranged in the hollow portion of said rotor body and formed by a winding of superconductive wire, first means for cooling the field winding to an extremely low temperature, a hollow cylindrical damper disposed to surround the field winding and being made of a good electrical conductor, a cylindrical damper support disposed between said damper and the field winding for supporting said damper, a vacuum space being defined between said damper support and the field winding, a plurality of spacers arranged between said damper and said damper support for restricting heat flow between said damper and said damper support, said spacers extending in the axial direction of said rotor body.

7. The rotor for a rotary electrical machine having a superconductive field winding as defined in claim 6, wherein said spacer is provided with interstices, and further including second means for circulating a cooling medium through the interstices defined by said spacer.

8. A rotor for a rotary electrical machine having a superconductive field winding comprising a hollow rotor body including a shaft rotatably supported by bearing means, the superconductive field winding being arranged in the hollow portion of said rotor body and formed by a winding of superconductive wire, first means for cooling the field winding to an extremely low temperature, a hollow cylindrical damper disposed to surround the field winding and being made of a good electrical conductor, a cylindrical damper support disposed between said damper and the field winding for supporting said damper and which is so arranged as to define a vacuum space between it and the field winding, said damper support being constructed with penetrating holes extending therethrough in the axial direction of said rotor, second means for circulating a cooling medium through said penetrating holes, and thermal resistance means providing contact parts between said damper and said damper support for restricting heat flow between said damper and said damper support.

9. The rotor for a rotary electrical machine having a superconductive field winding as defined in claim 8, wherein said thermal resistance means is formed by a plurality of protuberances projecting from the inner cylindrical surface of said damper into contact with said damper support.

10. The rotor for a rotary electrical machine having a superconductive field winding as defined in claim 9, wherein said protuberances are formed as elongated projections extending in the axial direction of said rotor body.

11. The rotor for a rotary electrical machine having a superconductive field winding as defined in claim 10, further including third means for circulating a cooling medium through interstices defined between said protuberances.

12. A rotor for a rotary electrical machine having a superconductive field winding comprising a hollow rotor body including a shaft rotatably supported by bearing means, the superconductive field winding being arranged in the hollow portion of said rotor body and formed by a winding of superconductive wire, first means for cooling the field winding to an extremely low temperature, a hollow cylindrical damper disposed to surround the field winding and being made of a good electrical conductor, a cylindrical damper support disposed between said damper and the field winding for supporting said damper and which is so arranged as to define a vacuum space between it and the field winding, said damper having a plurality of protuberances projecting from the inner cylindrical surface of said damper to contact said damper support for restricting heat flow between said damper and said damper support, said protuberances being elongated projections extending in the axial direction of said rotor body, conduits disposed in contact with the inner surface of said damper support, second means for introducing a cooling medium into said conduits, and third means for circulating a cooling medium through interstices defined between said protuberances.

* * * * *